March 1, 1927.
M. MAURAN
1,619,430
GAS ABSORPTION APPARATUS
Filed Sept. 18, 1923   2 Sheets-Sheet 2
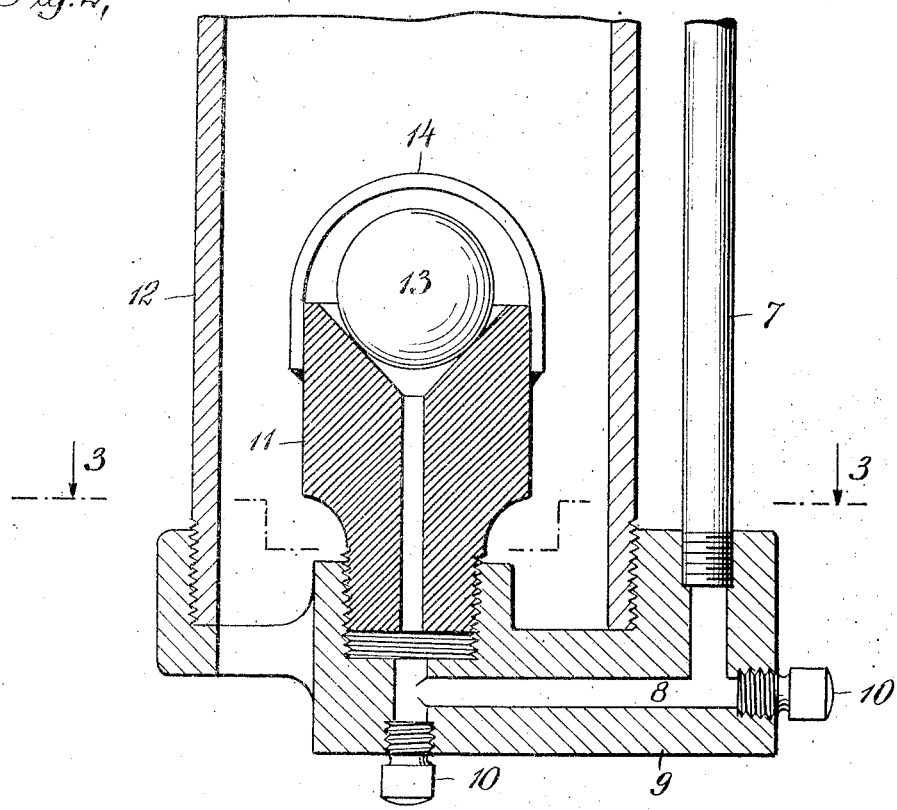
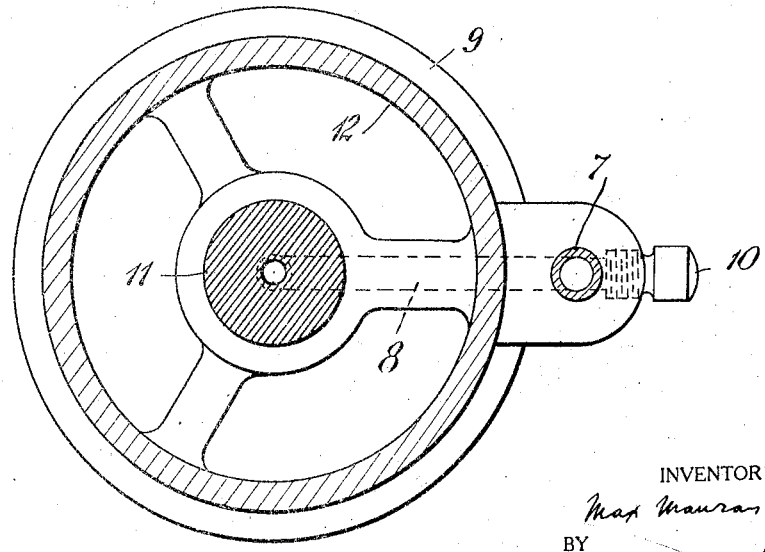
INVENTOR
Max Mauran
BY
Pennie, Davis, Marvin and Edmonds
ATTORNEYS Patented Mar. 1, 1927.

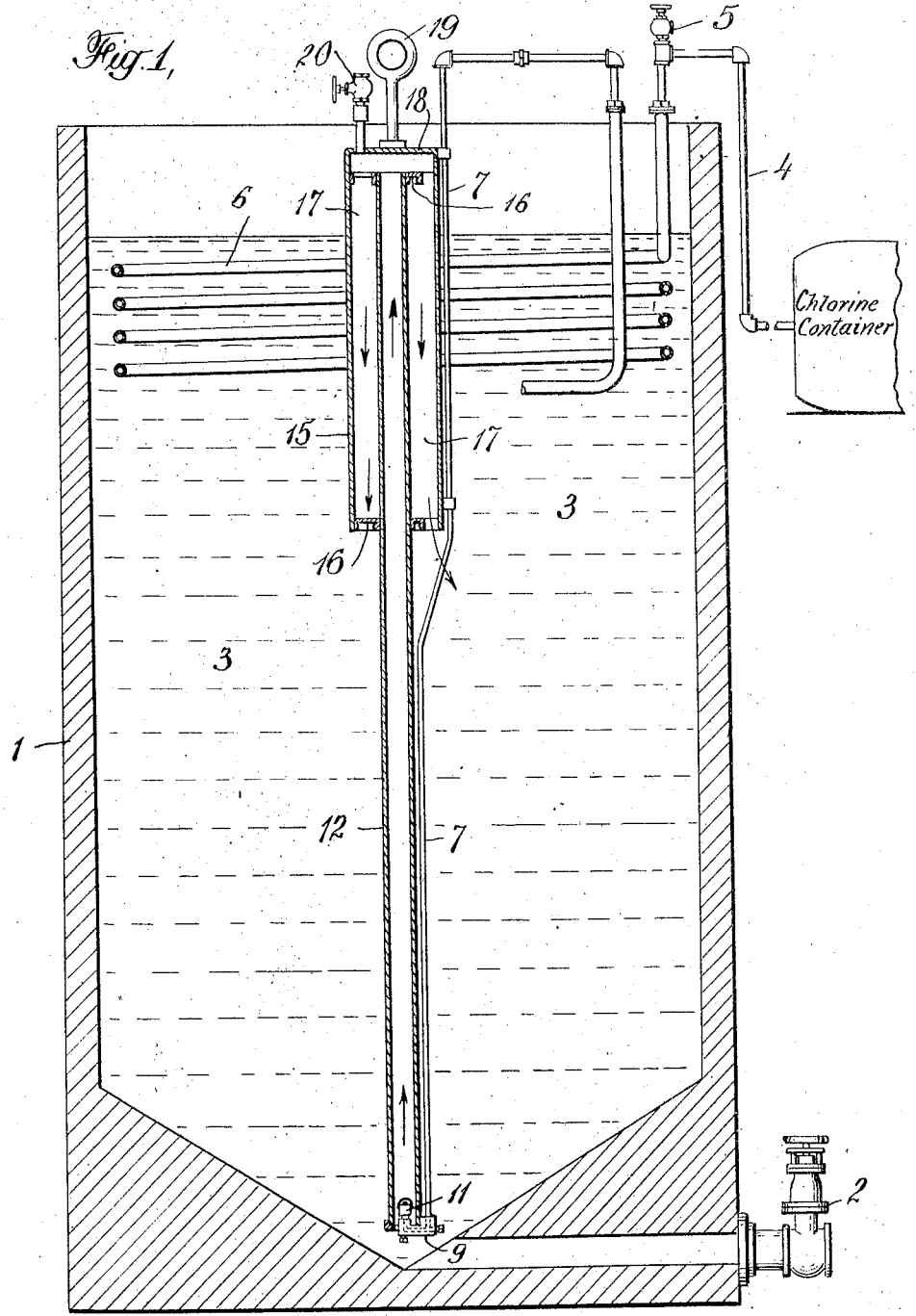

1,619,430

UNITED STATES PATENT OFFICE.

MAX MAURAN, OF NIAGARA FALLS, NEW YORK, ASSIGNOR TO THE MATHIESON ALKALI WORKS, INC., OF NEW YORK, N. Y., A CORPORATION OF VIRGINIA.

GAS-ABSORPTION APPARATUS.

Application filed September 18, 1923. Serial No. 663,574.

This invention relates to an apparatus for the absorption of gases in liquids and more particularly to an improved apparatus for the absorption of chlorine in milk-of-lime for the preparation of solutions of calcium hypochlorite for use in bleaching and for other purposes.

The invention provides an improved apparatus whereby the chlorine may be rapidly absorbed in the absorbing liquor, and whereby large quantities of the absorbing liquor are brought rapidly into contact with the gas and kept in rapid circulation so that objectionable decomposition will not take place.

In the improved apparatus of the present invention the air-lift principle is made use of to bring large quantities of the absorbing liquor into intimate contact with the gas and to promote rapid circulation and agitation, with resulting rapid absorption of the gas.

The apparatus described and claimed herein is particularly adapted for the practice of the process described and claimed in my copending application filed January 8, 1923, Serial No. 611,222.

The invention will be further described in connection with the accompanying drawings illustrating an apparatus embodying the invention. In the accompanying drawings, Fig. 1 is a vertical sectional view of the apparatus;

Fig. 2 is an enlarged fragmentary view showing the base of the air-lift column of Fig. 1; and Fig. 3 is a sectional view of the line 3—3 of Fig. 2.

In the embodiment of the invention illustrated, the apparatus consists of a tank or vat 1 which is made of concrete or other suitable material resistant to the action of the solutions being handled. This tank is provided with a valve controlled draw-off 2 and is adapted to be filled with the absorbing liquor indicated at 3.

In the manufacture of calcium hypochlorite solutions for use in bleaching and for other purposes this absorbing liquor may be a solution and suspension of lime in water, commonly know as milk-of-lime, and having such a lime content that when the proper amount of chlorine has been absorbed therein there will be very little free lime left in solution and suspension.

Liquid chlorine or compressed chlorine gas from any suitable source is supplied through the pipe 4 and passes through the expansion valve 5 to the expansion coil 6 and thence through the pipe 7 to the bottom of an air-lift column 12 hereinafter referred to. The chlorine supply may advantageously be provided in the form of cylinders or drums of liquid chlorine containing about one ton of liquid chlorine. Such a chlorine container is indicated conventionally in Fig. 1 as the source of supply.

At the bottom of the air-lift column 12 is a casting 9 illustrated more clearly in Figs. 2 and 3. The downwardly extending pipe 7 connects with a passage 8 in the casting 9 and this passage in turn connects with a passage in the upwardly extending nozzle 11. A plug 10 is provided to facilitate cleaning of this latter passage. The nozzle 11 carries at its upper end a ball check 13 which is restrained from too great motion from its seat by the band 14. The ball 13 acts as a check valve and prevents the liquor from flowing back into the passage 8 and pipe 7 when the gas flow is shut off or interrupted.

It will be noted that the column 12 is relatively long in proportion to its diameter so that it provides a long upward passage for the action of the chlorine upon the liquor. The column 12 terminates at a point somewhat above the normal level of the liquid in an enlarged casing 15 spaced away from the tube 12 by members 16 and providing an annular space 17 between the casing and the tube. The casing 15 is covered at its upper end as indicated at 18, the cover being provided with an eye-bolt 19 and a valve connection 20, and discharges downwardly into the tank below the normal liquid level therein. The eye-bolt permits the ready removal of the entire column from the tank by means of an overhead crane or other suitable hoisting device. The valve 20 allows the air pocket to be withdrawn from the casing when the tank is initially filled with the milk-of-lime solution.

In the operation of the apparatus the liquid chlorine gas is supplied from the chlorine container and passes through the pipe 4 to the pressure-reducing or expansion valve 5. Owing to the reduction in pressure, the gas is expanded and cooled, or in the case of liquid chlorine, is vaporized on expansion. The cooling effect, due to the expansion and vaporization, assists in cooling the absorbing liquor, this cooling being effected by the expansion coil 6 immersed in the liquor. This cooling action is important in neutralizing and controlling the heat produced by the rapid absorption of the chlorine gas which takes place in the practice of the invention.

After the chlorine gas has expanded and has served to cool the liquor it is then discharged through the nozzle 11 into the bottom of the air-lift column 12. The chlorine gas thus escaping into the bottom of the column tends to rise therein and reduces the density of the column as a whole so that a rapid flow upwardly through the column 13 takes place, on the air-lift principle, the heavier liquor in the tank about the passage displacing the liquor chlorine mixture of reduced density therein. During this rapid upward flow through the relatively small tube 12 the chlorine gas is brought into intimate contact with the milk-of-lime and rapid absorption is promoted, while the rapid flow and agitation incident to this air-lift action keeps the milk-of-lime well agitated and reduces danger of over-chlorination.

The chlorine gas will be to a considerable extent absorbed in the relatively long upward passage through the column 12. Any unabsorbed chlorine gas will be discharged together with the liquor solution into the annular space within the casing 17 where the absorption of the chlorine is completed. Owing to the rapid flow upwardly through the column 12 the liquor and unabsorbed gas are discharged with considerable agitation and splashing into the annular container, thus further promoting the completion of the absorption of the chlorine. The relatively enlarged annular space within the casing 15 reduces the velocity of flow of the solution and provides additional time for the completion of the absorption while it also serves to confine any unabsorbed chlorine which remains in the upper portion of the casing in gaseous form until absorbed.

In operation, accordingly, the chlorine is introduced into a moving body of the solution, causing the solution and gas to pass upwardly with rapid circulation and agitation and with resulting rapid absorption of the gas in the liquor. Fresh amounts of the solution are continually drawn in at the bottom of the column 12 and admixed with further amounts of chlorine gas. The solution escaping from the tube of the air-lift conduit pipe 12 overflows into the surrounding space and again enters the main body of solution. In this way the entire body of milk-of-lime is kept in agitation and the chlorination is progressively and rapidly effected.

The invention is applicable to the absorption of chlorine gas in other solutions such as those used in making alkaline hypochlorites; as well as for the absorption of other gases, particularly liquefied gases, in absorption media therefor. It will be noted that the agitation of the solution and the absorption of the gas therein are brought about without mechanical agitation and without the application of external power for that purpose. The pressure of the gas itself, in the case of a compressed or liquefied gas, such as chlorine, is utilized for forcing the gas to the bottom of the air-lift column, and the air-lift effect together with the injector effect resulting from the discharge of the gas into the liquid are utilized to bring about the rapid circulation upwardly through the tube 12 and the agitation of the body of solution, as a whole, resulting therefrom.

The expansion coil submerged in the liquid may be omitted and the chlorine gas passed directly to the bottom of the air-lift column, but the employment of an expansion coil in the manner described and illustrated has the important advantage of providing for the cooling of the solution and the neutralizing of the heat of reaction without the necessity of using extraneous cooling means, and also without requiring the provision of extraneous means for heating the chlorine to promote its vaporization. The utilization of the cooling effect of the expanding and vaporizing chlorine in this way enables rapid circulation and absorption to take place without excessive overheating of the solution by the heat of reaction.

I claim:—

1. Gas absorption apparatus comprising a tank adapted to contain liquid, a vertically arranged tubular passage in said tank, the lower end of said passage being in open communication with said tank, a casing covering the upper end of said passage, said casing opening downwardly below the normal liquid level in the tank, and means to introduce gas into the lower portion of said passage below the point at which said casing opens into said tank.

2. Gas absorption apparatus comprising a tank adapted to contain liquid, a vertically arranged tubular passage in said tank, the lower end of said passage being in open communication with said tank, a casing covering the upper end of said passage, said casing opening downwardly below the normal liquid level in the tank, means to introduce gas into the lower portion of said passage at a point below the opening of said casing, and a valved outlet connected to the upper portion of said casing.

3. Gas absorption apparatus comprising a tank adapted to contain a liquid, a vertical tube centrally arranged within said tank, the lower end of said tube being in open communication with said tank, a tubular casing at the upper end of said tube annularly spaced therefrom and extending below the normal liquid level in the tank, a cover at the upper end of said casing spaced from the upper end of said tube, and a nozzle within the lower portion of said tube to provide for the introduction of gas therein.

4. Gas absorption apparatus comprising a tank adapted to contain a liquid, a vertically arranged tubular passage in said tank, the lower end of said passage being in open communication with said tank, a casing covering the upper end of said passage, said casing opening downwardly below the normal liquid level in the tank, a container for a gas under pressure, an expansion or vaporization receptacle within the tank and means to introduce a gas from said receptacle into the lower portion of said tubular passage.

In testimony whereof I affix my signature.

MAX MAURAN.